US012621861B2

(12) United States Patent
Cheng et al.

(10) Patent No.: US 12,621,861 B2
(45) Date of Patent: May 5, 2026

(54) METHODS AND APPARATUS FOR SIDELINK COMMUNICATIONS ON UNLICENSED FREQUENCY BANDS

(71) Applicant: MediaTek Singapore Pte. Ltd., Singapore (SG)

(72) Inventors: Jun-Qiang Cheng, Beijing (CN); Tao Chen, Beijing (CN); Min Lei, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 542 days.

(21) Appl. No.: 18/165,761

(22) Filed: Feb. 7, 2023

(65) Prior Publication Data

US 2023/0254898 A1     Aug. 10, 2023

Related U.S. Application Data

(63) Continuation of application No. PCT/CN2022/075404, filed on Feb. 7, 2022.

(30) Foreign Application Priority Data

Jan. 9, 2023     (CN) .......................... 202310025110.2

(51) Int. Cl.
*H04W 72/25* (2023.01)
*H04L 5/00* (2006.01)
(Continued)

(52) U.S. Cl.
CPC ....... *H04W 74/0816* (2013.01); *H04L 5/0073* (2013.01); *H04W 72/0453* (2013.01); *H04W 72/25* (2023.01)

(58) Field of Classification Search
None
See application file for complete search history.

(56) References Cited

U.S. PATENT DOCUMENTS

| | | | |
|---|---|---|---|
| 2021/0195649 A1 | 6/2021 | Xue | H04W 72/04 |
| 2022/0159725 A1* | 5/2022 | Liu | H04W 76/14 |

(Continued)

FOREIGN PATENT DOCUMENTS

| | | |
|---|---|---|
| CN | 112740809 A | 4/2021 |
| WO | WO 2019/214544 | 5/2018 |

(Continued)

OTHER PUBLICATIONS

European Intellectual Property Office Action, dated Apr. 13, 2023 (10 pages).

(Continued)

*Primary Examiner* — Jenkey Van
(74) *Attorney, Agent, or Firm* — Helen Mao; Imperium Patent Works

(57)     ABSTRACT

Apparatus and methods are provided for sidelink resource selection in unlicensed frequency bands. In one novel aspect, a combination of SL resource selection procedure and a listen-before-talk (LBT) procedure are used for resource selection in unlicensed frequency bands. In one embodiment, the LBT procedure is performed after the SL resource selection procedure. In one embodiment, the candidate resource selected by the SL resource selection procedure has an overbooking resource size larger than or equal to a resource size required for the SL data transceiving. In another embodiment, the overbooking resource size is dynamically determined based on one or more preconfigured conditions comprising an LBT failure probability, channel loading status information, and channel congestion control information. In yet another embodiment, the candidate resources are multi-consecutive-slot (MCSt) resources with configured multiple consecutive resource blocks. In one embodiment, one or more configuration parameters are dynamically configured.

20 Claims, 6 Drawing Sheets

(51) Int. Cl.
 *H04W 72/0453* (2023.01)
 *H04W 74/0816* (2024.01)

(56)  References Cited

U.S. PATENT DOCUMENTS

| | | | | |
|---|---|---|---|---|
| 2022/0256539 A1* | 8/2022 | Xue | | H04W 72/02 |
| 2022/0376831 A1* | 11/2022 | Yoshioka | | H04W 72/02 |
| 2023/0022691 A1* | 1/2023 | Ji | | H04W 72/02 |
| 2023/0087110 A1* | 3/2023 | Hu | | H04W 74/0808 |
| | | | | 370/329 |
| 2023/0232431 A1* | 7/2023 | Wu | | H04W 16/14 |
| | | | | 370/329 |
| 2023/0389122 A1* | 11/2023 | Ko | | H04W 72/566 |
| 2024/0306198 A1* | 9/2024 | Yu | | H04W 16/14 |

FOREIGN PATENT DOCUMENTS

| | | |
|---|---|---|
| WO | WO2020167094 | 2/2019 |
| WO | WO 2020/248997 | 6/2019 |
| WO | WO 2021/013811 | 7/2019 |
| WO | WO2021194108 | 3/2020 |
| WO | WO2021262577 | 6/2020 |
| WO | 2020248997 A1 | 12/2020 |
| WO | 2021194108 A1 | 9/2021 |
| WO | 2021262577 A1 | 12/2021 |

OTHER PUBLICATIONS

Taiwan Intellectual Property Office Action, dated Jul. 25, 2023 (7 pages).
China Intellectual Property Office Action 202310025110.2 Dated Aug. 1, 2025.

* cited by examiner

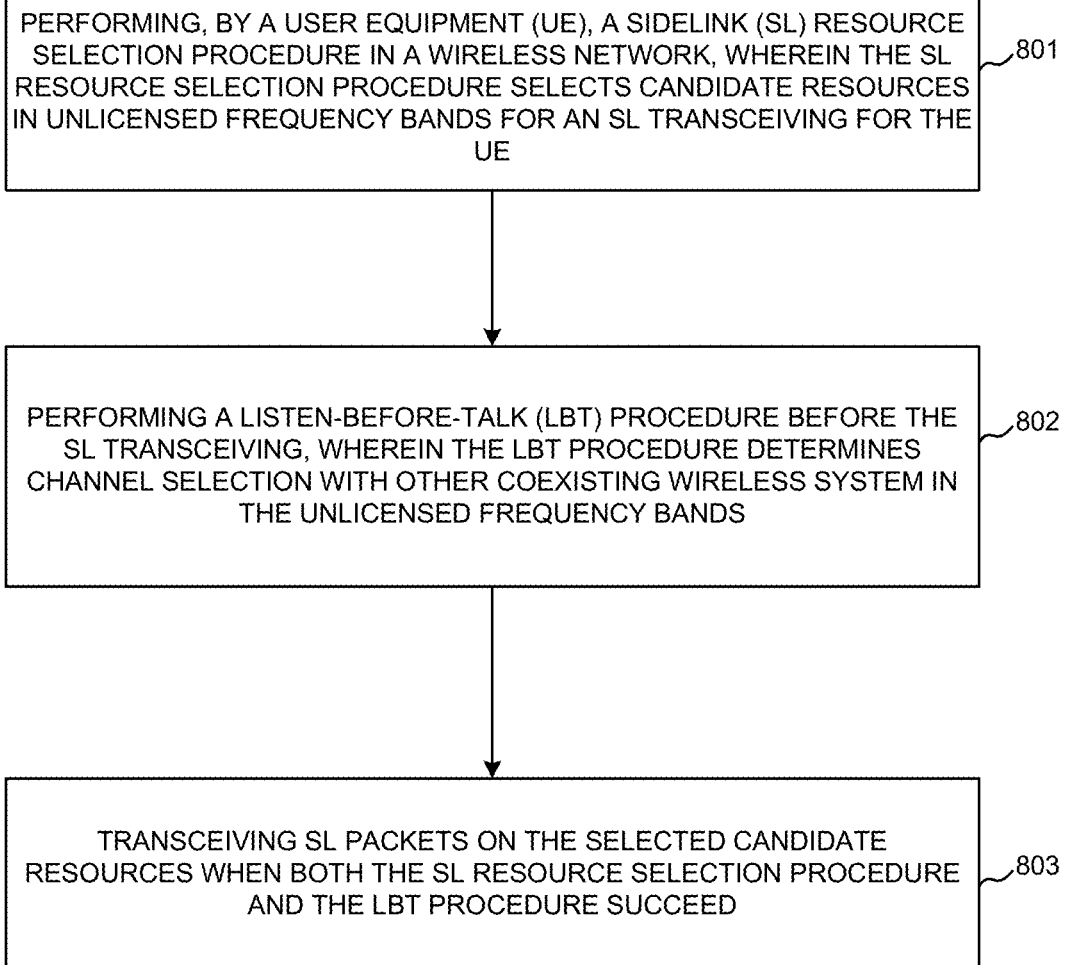

PERFORMING, BY A USER EQUIPMENT (UE), A SIDELINK (SL) RESOURCE SELECTION PROCEDURE IN A WIRELESS NETWORK, WHEREIN THE SL RESOURCE SELECTION PROCEDURE SELECTS CANDIDATE RESOURCES IN UNLICENSED FREQUENCY BANDS FOR AN SL TRANSCEIVING FOR THE UE ⟋801

PERFORMING A LISTEN-BEFORE-TALK (LBT) PROCEDURE BEFORE THE SL TRANSCEIVING, WHEREIN THE LBT PROCEDURE DETERMINES CHANNEL SELECTION WITH OTHER COEXISTING WIRELESS SYSTEM IN THE UNLICENSED FREQUENCY BANDS ⟋802

TRANSCEIVING SL PACKETS ON THE SELECTED CANDIDATE RESOURCES WHEN BOTH THE SL RESOURCE SELECTION PROCEDURE AND THE LBT PROCEDURE SUCCEED ⟋803

FIG. 8

METHODS AND APPARATUS FOR SIDELINK COMMUNICATIONS ON UNLICENSED FREQUENCY BANDS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/075404, titled "Methods and apparatus for Sidelink Communications on Unlicensed Frequency Bands," with an international filing date of Feb. 7, 2022. This application claims priority under 35 U.S.C. § 119 from Chinese Application Number CN 202310025110.2 titled "METHODS AND APPARATUS FOR SIDELINK COMMUNICATIONS ON UNLICENSED FREQUENCY BANDS" filed on Jan. 9, 2023. The disclosure of each of the foregoing documents is incorporated herein by reference.

TECHNICAL FIELD

The disclosed embodiments relate generally to wireless communication, and, more particularly, to sidelink communication on unlicensed frequency bands.

BACKGROUND

Sidelink (SL) communication was introduced to enable direct transmission between two user equipments (UEs), which is also known as the device-to-device (D2D) communications. With the development of 3GPP normative works, the scenarios of sidelink are extended to UE-to-network relay, public safety, vehicle-to-everything (V2X) communications and so on. The critical role of sidelink in long term evolution (LTE) and the new radio (NR) has made it an inevitable remedy to support diverse use cases of future wireless communications.

To meet the increased demands of wireless data traffic, using unlicensed frequency bands has drawn a lot of attention in the wireless industry to improve the capacity of future wireless communication systems. The utilization of unlicensed spectrum for sidelink communications is regarded as the most promising direction for further development of sidelink communication. However, some radio access technologies (RATs), such as NR-U communications, Wi-Fi, etc., have already operated in the unlicensed frequency bands. One of the most critical issues of allowing sidelink communications to operate in the unlicensed frequency bands is to ensure the fair and harmonious coexistence with other RATs.

Improvements and enhancements are required for sidelink resource allocation in unlicensed frequency bands to ensure harmonious coexistence with other RATs.

SUMMARY

Apparatus and methods are provided for sidelink resource selection in unlicensed frequency bands. In one novel aspect, a combination of SL resource selection procedure and a listen-before-talk (LBT) procedure are used for resource selection in unlicensed frequency bands. In one embodiment, the LBT procedure is performed after the SL resource selection procedure. In one embodiment, the candidate resource selected by the SL resource selection procedure has an overbooking resource size larger than or equal to a resource size required for the SL data transceiving. In another embodiment, the overbooking resource size is dynamically determined based on one or more preconfigured conditions comprising an LBT failure probability, channel loading status information, and channel congestion control information. In yet another embodiment, the candidate resources are multi-consecutive-slot (MCSt) resources with configured multiple consecutive resource blocks. In one embodiment, a Type-1 LBT is configured when the LBT is performed outside a channel occupancy time (COT) or when the LBT initiates a COT, and a Type-2A, a Type-2B or a Type-2C LBT is configured when the LBT is performed inside the COT. In another embodiment, the one or more configuration parameters are dynamically configured, and wherein the configuration parameters comprising a maximum number of resources to be configured, a maximum number of resources indicated in a $1^{st}$-stage sidelink channel information (SCI), and a LBT trigger time. In one embodiment, a selection window is configured, wherein the SL resource selection procedure is performed within the selection window, and the LBT procedure is performed before the selected resource for a SL transceiving is triggered at a starting slot n, and wherein a starting slot for the selection window is slot n plus a processing time T1, and a sending slot for the selection window is before n plus a packet delay budget (PDB). In yet another embodiment, a new selection window is dynamically configured upon detecting a failure of the LBT procedure before an end of the selection window. In one embodiment, the SL resource selection procedure in the selection window excludes one or more candidate resources based on predefined rules.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary flow chart for the resource selection for sidelink communication in unlicensed frequency bands in accordance with embodiments of the current invention.

DETAILED DESCRIPTION

Reference will now be made in detail to some embodiments of the invention, examples of which are illustrated in the accompanying drawings.

Figure 1A:
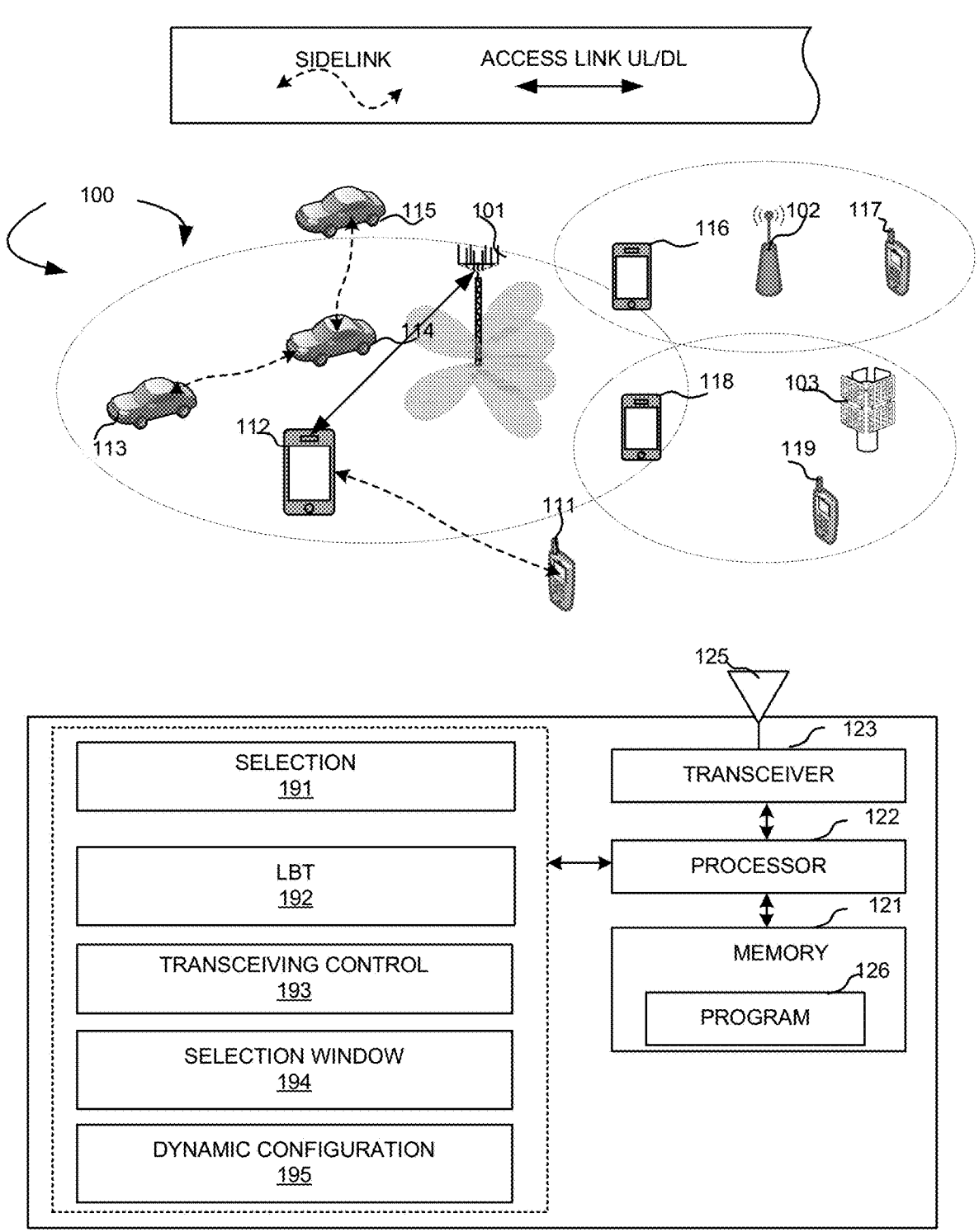
FIG. 1A illustrates a schematic system diagram illustrating an exemplary wireless network for sidelink data communication in unlicensed frequency bands with other coexistence RATs in accordance with embodiments of the current invention.

FIG. 1A is a schematic system diagram illustrating an exemplary wireless network for sidelink data communication in unlicensed frequency bands with other coexistence RATs in accordance with embodiments of the current invention. Wireless network 100 includes multiple communication devices or mobile stations, such as user equipments (UEs) 111, 112, 113, 114, and 115, which are configured with sidelink in unlicensed frequency bands. The exemplary mobile devices in wireless network 100 have sidelink capabilities. Sidelink communications refer to the direct communications between terminal nodes or UEs without the data going through the network. For example, UE 113 communicates with UE 114 directly without going through links with the network units. The scope of sidelink transmission also supports UE-to-network relay to extend the service range of an eNB, where the inter-coverage UE acts as the relay node between an eNB and an out-of-coverage UE. For example, UE 112 is connected with base station 101 through an access link. UE 112 provides network access for out-of-coverage UE 111 through sidelink relay. The base station, such as base station 101, may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequencies. Base station 101 is an exemplary base station. With the demands for more capacity and the development of sidelink communication, it is important for the sidelink devices to use the unlicensed frequency bands and be harmoniously coexistence with devices with other RATs operating in the same unlicensed frequency bands. For example, neighboring UEs 116 and 117 communicate with base station 102 through other RATs, such as Wi-Fi, sharing the same unlicensed frequency band. Neighboring UEs 118 and 119 communicate with base station 103 through other RATs, such as NR, sharing the same unlicensed frequency band.

For sidelink transmissions on the unlicensed spectrum (SL-U), efficient resource allocation is one of the most critical issues to ensure the fair coexistence with other RATs operated in the unlicensed spectrum, such as NR-U and Wi-Fi, etc. Two modes of resource allocation schemes are identified for NR sidelink. The first one is named Mode-1, while the second is Mode-2. For Mode-1, the resource allocation is scheduled by the gNB using the Uu interface. This mode is only suitable for the sidelink UEs in network coverage. For Mode-2, the sidelink UE can autonomously select the resources from a (pre-)configured resource pool(s) based on the channel sensing mechanism over PC5 interface. In this case, the sidelink UEs can operate both under in-coverage and out-of-coverage. When a transmitting sidelink UE attempts to select/reserve resources with Mode-2, it should conduct the resource selection/reservation procedures, which include two stages: resource sensing and resource selection/reservation. Generally, in the resource sensing stage, to avoid causing interference to the existing sidelink transmissions operated by other sidelink UEs, the candidate resources potentially available for the sidelink transceiving are identified. Next, in the resource selection stage, the sidelink UE can select the candidate resources used for transmission block (TB) transmission with the assistance of the sensing results. In one novel aspect, listen before talk (LBT) is used in the selection stage for the unlicensed frequency bands resources. LBT is a spectrum sharing technology by which a device must perform the clear channel assessment (CCA) check before it starts a transmission. Empowered by the LBT mechanism, it is possible for multiple UEs to share a channel, and fair coexistence among different RATs can be guaranteed. In one novel aspect, the combination design of sidelink sensing and LBT is provided for a resource allocation scheme to ensure the harmonious coexistence among sidelink and other wireless systems.

FIG. 1A further illustrates simplified block diagrams of a mobile device/UE for operating in the unlicensed frequency band. The UE 111 is as a example. The UE 111 has an antenna 125, which transmits and receives radio signals. An RF transceiver circuit 123, coupled with the antenna, receives RF signals from antenna 125, converts them to baseband signals, and sends them to processor 122. In one embodiment, the RF transceiver may comprise two RF modules (not shown). RF transceiver 123 also converts received baseband signals from processor 122, converts them to RF signals, and sends out to antenna 125. Processor 122 processes the received baseband signals and invokes different functional modules to perform features in the UE 111. Memory 121 stores program instructions and data 126 to control the operations of the UE 111. Antenna 125 sends uplink transmission and receives downlink transmissions to/from base stations.

The UE 111 also includes a set of control modules that carry out functional tasks. These control modules can be implemented by circuits, software, firmware, or a combination of them. A selection module 191 performs sidelink (SL) resource selection procedure, wherein the SL resource selection procedure selects candidate resources in unlicensed frequency bands for an SL transceiving for the UE. An LBT module 192 performs a LBT procedure before the SL transceiving, wherein the LBT procedure determines channel selection with other coexisting wireless systems in the unlicensed frequency bands. A transceiving controller 193 transmits and receives SL packets on the selected candidate resources when both the SL resource selection procedure and the LBT procedure succeed. A selection window module 194 configures a selection, wherein the SL resource selection procedure is performed within the selection window, and the LBT procedure is performed before the selected resource for a SL transceiving is triggered at a starting slot n, and wherein a starting slot for the selection window is slot n plus a processing time T1, and a sending slot for the selection window is before n plus a packet delay budget (PDB). A dynamic configuration module 195 dynamically configures configuration parameters comprising a maximum number of resources indicated in a $1^{st}$-stage sidelink channel information (SCI), and a LBT trigger time.

Figure 1B:
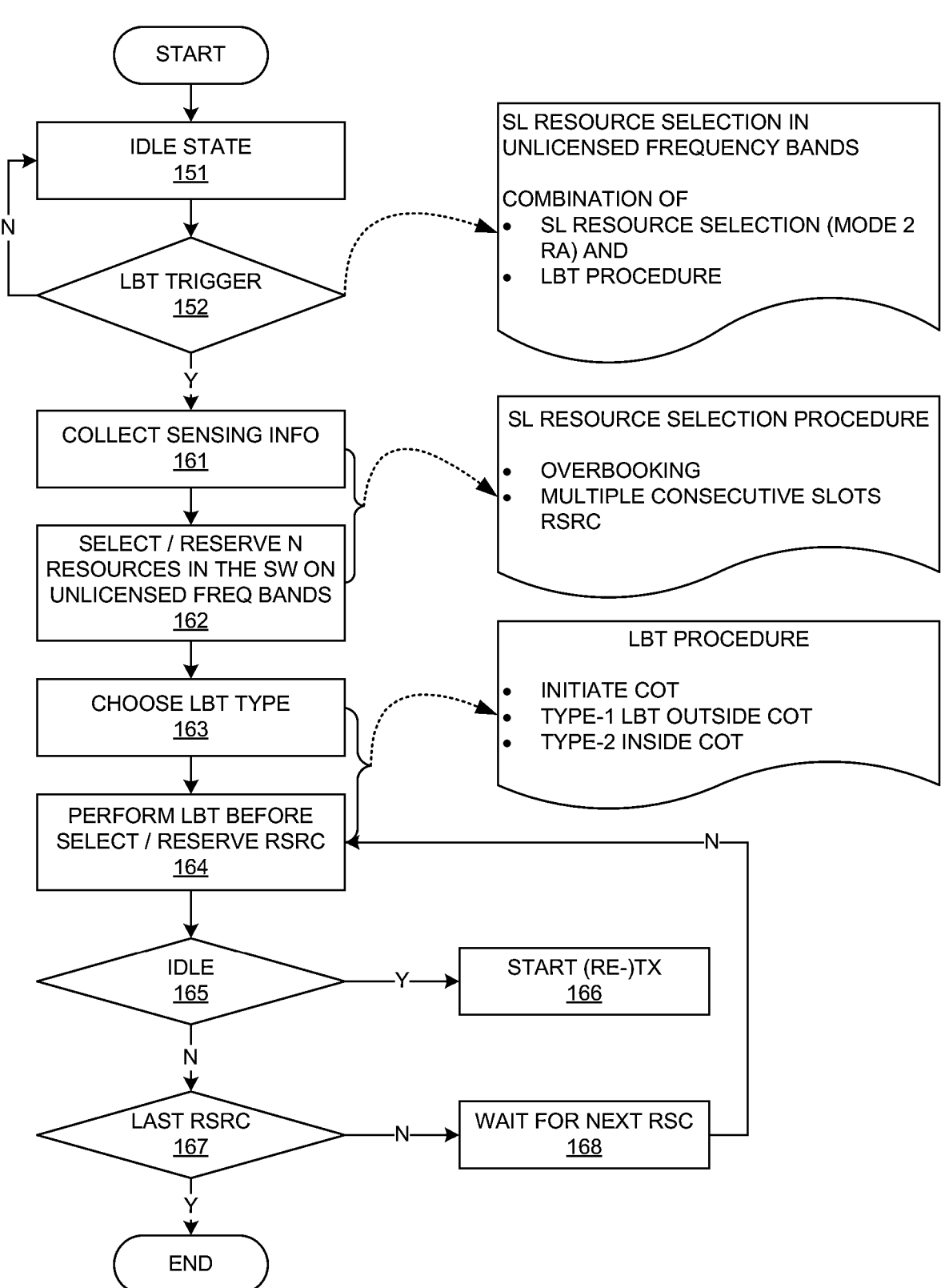
FIG. 1B illustrates exemplary flow diagrams for sidelink communication on unlicensed spectrum with LBT sensing and selection in accordance with embodiments of the current invention.

FIG. 1B illustrates exemplary flow diagrams for sidelink communication on unlicensed spectrum with LBT sensing and selection in accordance with embodiments of the current invention. At step 151, the UE is in the IDLE state. When a sidelink UE is not transmitting, it keeps sensing the unlicensed channel resources in order to identify the available candidate resources. At step 152, the UE selects or reselects new candidate resources. In one novel aspect, the SL resource selection in the unlicensed frequency bands uses the combination of SL resources selection procedure, such as Mode-2 RA, and the LBT procedure.

At step 161, the UE collects sensing information. During the sensing procedure, the sidelink UE decodes the $1^{st}$-stage SCI from other sidelink UEs on the unlicensed channel. By decoding the $1^{st}$-stage SCI, the sidelink UE can know the resources that have been reserved by other sidelink UEs for their TB initial transmission and re-transmission(s). During the sensing procedure, the sidelink UE also measures the sidelink reference signal received power (RSRP) of the transmission from other sidelink UEs. The information element (IE) sl-RS-ForSensing from a higher layer indicates whether the RSRP of physical sidelink control channel (PSCCH) or RSRP of PSSCH is measured. The RSRP can be measured by the demodulation reference signal (DMRS) of physical sidelink control channel (PSCCH), and/or measured by the DMRS of physical sidelink shared channel (PSSCH). This sensing information, including the $1^{st}$-stage SCI and RSRP, is stored by the sidelink UE, and will be used in the following resource selection procedure. At step 162, A sidelink UE can select, reselect or reserve new resources when one or more predefined conditions are detected, including when a new TB is generated, when the new TB does not fit in the previously selected/reserved resources, when the reselection counter (RC) decreased to zero, and other conditions that requires new SL resources. If the resource (re-)selection/reservation is triggered at slot n, the sidelink UE should first collect the sensing information in a certain period $[n-T_0, n-T_{proc,0}]$, where $T_0$ is an integer defined in number of slot and equals to x ms (e.g., 1100 ms or 100 ms), which is determined by the higher layer IE sl-SensingWindow. $T_{proc,0}$ is the time required to complete the sensing procedure. In one embodiment, the selected resources are overbooking candidate resources with an overbooking resource size larger than or equal to the resource size required for the SL data transceiving. In another embodiment, the candidate resources are multi-consecutive-slot (MCSt) resources with configured multiple consecutive resource blocks.

In one novel aspect, the sidelink UE performs an LBT procedure in combination with the SL resource selection procedure. At step 163, the UE chooses an LBT type based on one or more conditions including a LBT type configuration, the traffic type/QoS. At step 164, the selected LBT procedure is performed before transmission of every selected/reserved resource. In one embodiment, the LBT procedure initiates a channel occupancy time (COT). If the LBT is used to initiate a COT or the LBT is out of the COT, Type-1 LBT is configured. If the LBT is used within an initiated/shared COT, the LBT type is (pre-)configured from Type-2A LBT, Type-2B LBT and Type-2C LBT. At step 165, the UE determines if the UE is in the IDLE state. If step 165 determines yes, the UE starts transmission or retransmission at step 166. If step 165 determines no, the UE moves to step 167 and determines if this is the last selected or reserved resource. If step 167 determines yes, the procedure ends. If step 167 determines no, the UE moves to 168 and waits for the next resource. Once the next resource is available, the UE performs LBT before transceiving using the selected/reserved resources.

Figures 2, 3:
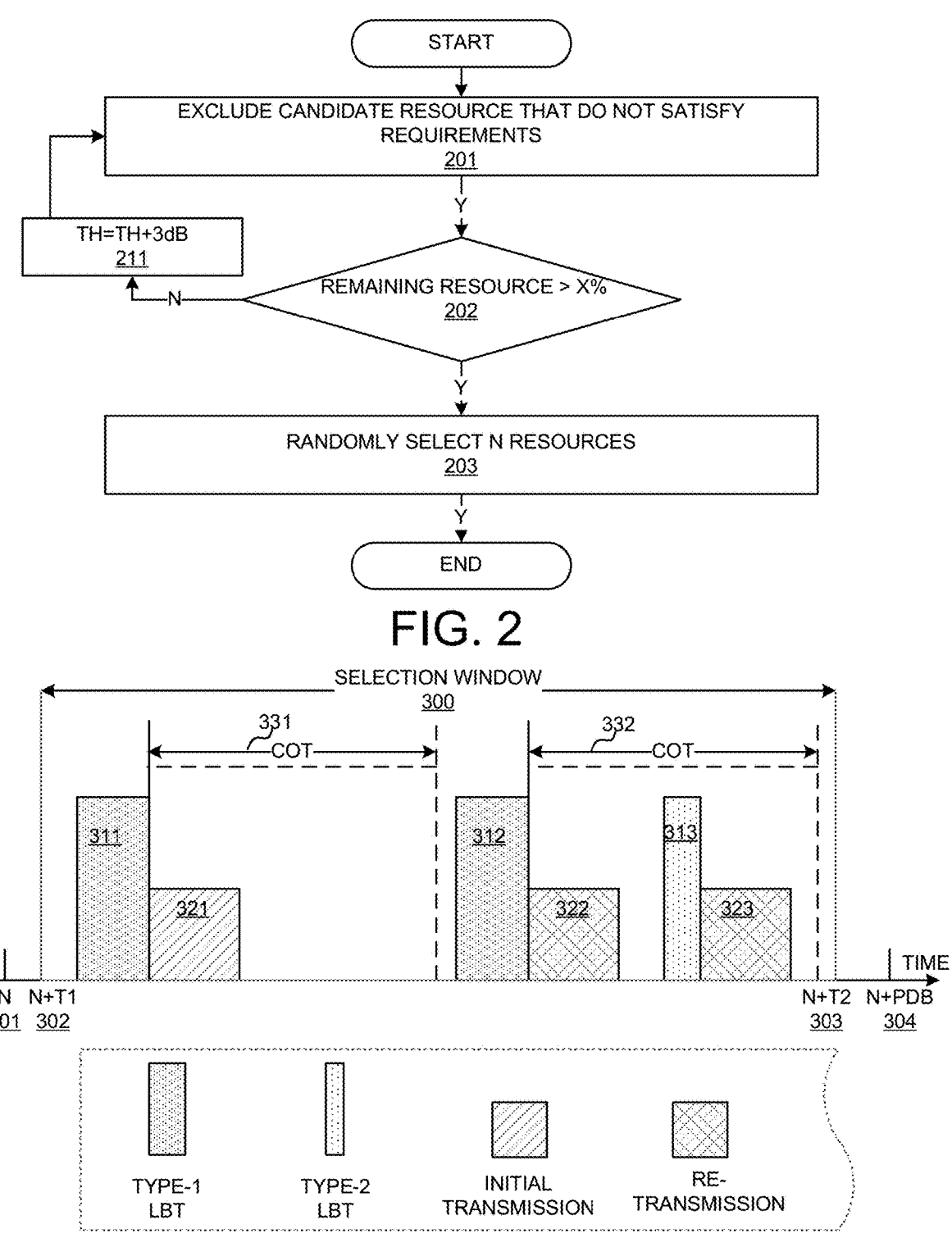
FIG. 2 illustrates exemplary flow diagrams of the SL resource selection that excludes some candidate resource based on predefined rules in accordance with embodiments of the current invention.
FIG. 3 illustrates exemplary diagrams of LBT type determination in accordance with embodiments of the current invention.

FIG. 2 illustrates exemplary flow diagrams of the SL resource selection that excludes some candidate resource based on predefined rules in accordance with embodiments of the current invention. After collecting the sensing information, the sidelink UE will select resources in a selection window (SW) defined by the range of $[n+T_1, n+T_2]$, where $T_1$ is the processing time, and $T_2$ is in the range $T_{2,min} \leq T_2 \leq PDB$, where $T_{2,min}$ is determined based on the priority of the TB and the SCS; PDB is the packet delay budget (PDB) in slot, which indicates the transmission deadline that the TB must be transmitted before it. When the SL resource selection or reselection procedure is triggered, the selection window is determined. The sidelink UE first excludes some candidate resources in the selection window. The exclusion resources can include the resources reserved by other sidelink UEs, which can be indicated by the reservation information in the $1^{st}$-stage SCI. For this case, the resources are only excluded if the sidelink UE has measured an RSRP of the reserved resources is higher than a RSRP threshold, which is determined by the higher layer parameter sl-Thres-RSRP-List. At step 201, the UE excludes candidate resource that does not satisfy one or more requirements. At step 202, after the exclusion process, the sidelink UE checks whether the percentage of the remaining candidate resources in the selection window meets the requirement, i.e., equals to or larger than x %. The value of x depends on the priority of the TB and is indicated by the higher layer parameter SL-TxPercentageConfig. If the requirement is not satisfied, at step 211, the RSRP threshold is increased. In one embodiment, the threshold is increased by 3 dB. The process moves to step 201. The process is iterated until the percentage of the remaining candidate resources in the selection window meets the requirement. After the requirement is satisfied, at step 203, the sidelink UE can randomly choose N resources used for transmission from the remaining available candidate resources in the selection window.

FIG. 3 illustrates exemplary diagrams of LBT type determination in accordance with embodiments of the current invention. In one embodiment, after the SL resource selection procedures, the sidelink UE determines the LBT type based on the (pre-)configuration and/or traffic type/QoS. The UE performs the LBT for the candidate resources. A selection window 300 with the range of the range of $[n+T_1, n+T_2]$ is determined, where $T_1$ is the processing time, and $T_2$ is in the range $T_{2,min} \leq T_2 \leq PDB$, where $T_{2,min}$ is determined based on the priority of the TB and the SCS; PDB is the packet delay budget (PDB) in slot, which indicates the transmission deadline that the TB must be transmitted. At time 301 of slot n, the SL transceiving is triggered. After processing time $T_1$, at time 302, the selection window starts. The selection window ends at 303 $n+T_2$ before n+PDB 304. In one novel aspect, the UE selects the SL candidate resources first and performs LBT procedure before the transmission using these selected candidate resources. An LBT procedure 311 is performed. In one embodiment, the LBT procedure initiates the COT. For example, COT 331 is initiated. Resource 321 is selected during the SL resource selection procedure and candidate resources are selected based on sensing results. In one embodiment, the selected resource 321 for initial transmission are multiple consecutive resources. LBT 311 is the LBT procedure that initiates the COT, wherein the LBT is a Type-1 LBT. Within the selection window 300, a retransmission is selected with the SL resource selectin procedure. For example, Resource 322 is selected for retransmission. LBT 312 is performed before the retransmission with the selected retransmission resource 322. LBT 312 is performed outside the COT 332. Type-1 LBT is selected for LBT 312 for retransmission with retransmission resource 322. A LBT 313 is performed before a retransmission with retransmission resources 323. LBT 313 is performed within the COT 332. LBT 313, which is performed within the COT, can be configured as a Type-2A, Type-2B, or Type-2C LBT.

Figure 4:
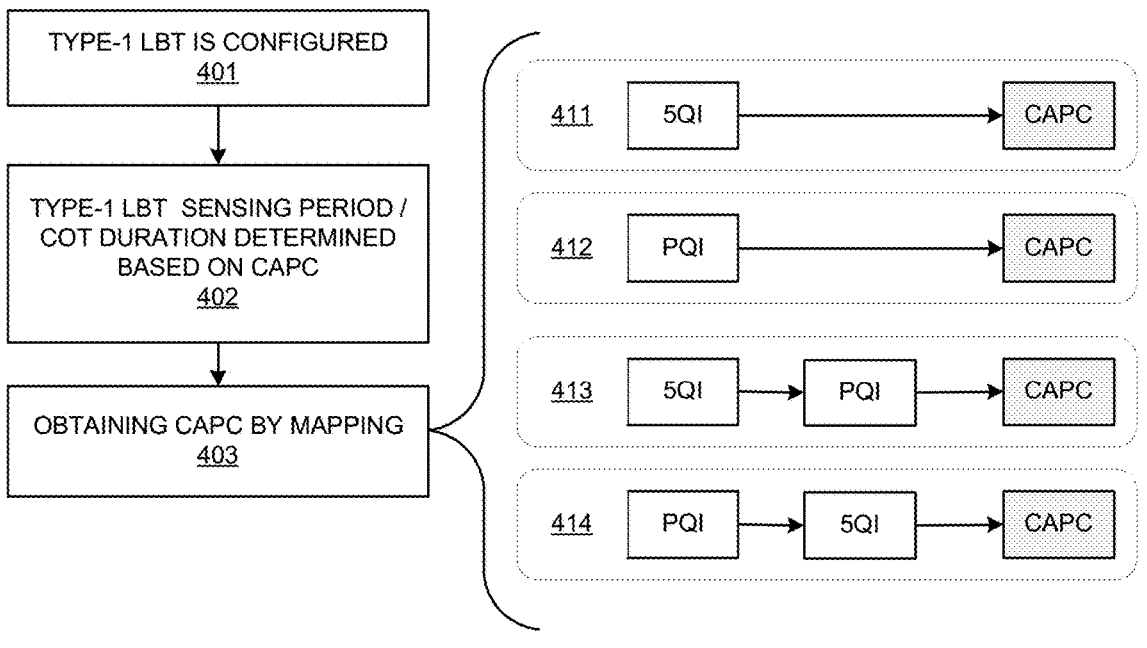
FIG. 4 illustrates exemplary diagrams for determining LBT configurations in accordance with embodiments of the current invention.

FIG. 4 illustrates exemplary diagrams for determining LBT configurations in accordance with embodiments of the current invention. In one embodiment, when Type-1 LBT is configured, the energy detection/sensing duration of the LBT is determined by the channel access priority class (CAPC). In another embodiment, when Type-1 LBT is configured, the duration of the COT that is after the success of the LBT is determined by the CAPC. At step 401, the UE determines that Type-1 LBT is configured. At step 402, the UE configures the LBT sensing period and/or the COT duration based on the CAPC. At step 403, the UE obtains the CAPC through mapping. The value of the CAPC is determined by predefined or preconfigured rules of direct or indirect mapping from the 5G quality of service (QoS) identifier (5QI) or the PC5 QoS identifier (PQI) of the traffic. In configuration 411, the CAPC is directly mapped from 5QI of the traffic. In configuration 412, the CAPC is directly mapped from PQI of the traffic. In configuration 413, the 5QI of the traffic is first mapped to PQI, and then the PQI is mapped to CAPC. In configuration 414, the PQI of the traffic is first mapped to 5QI, and then the 5QI is mapped to CAPC.

Figure 5:
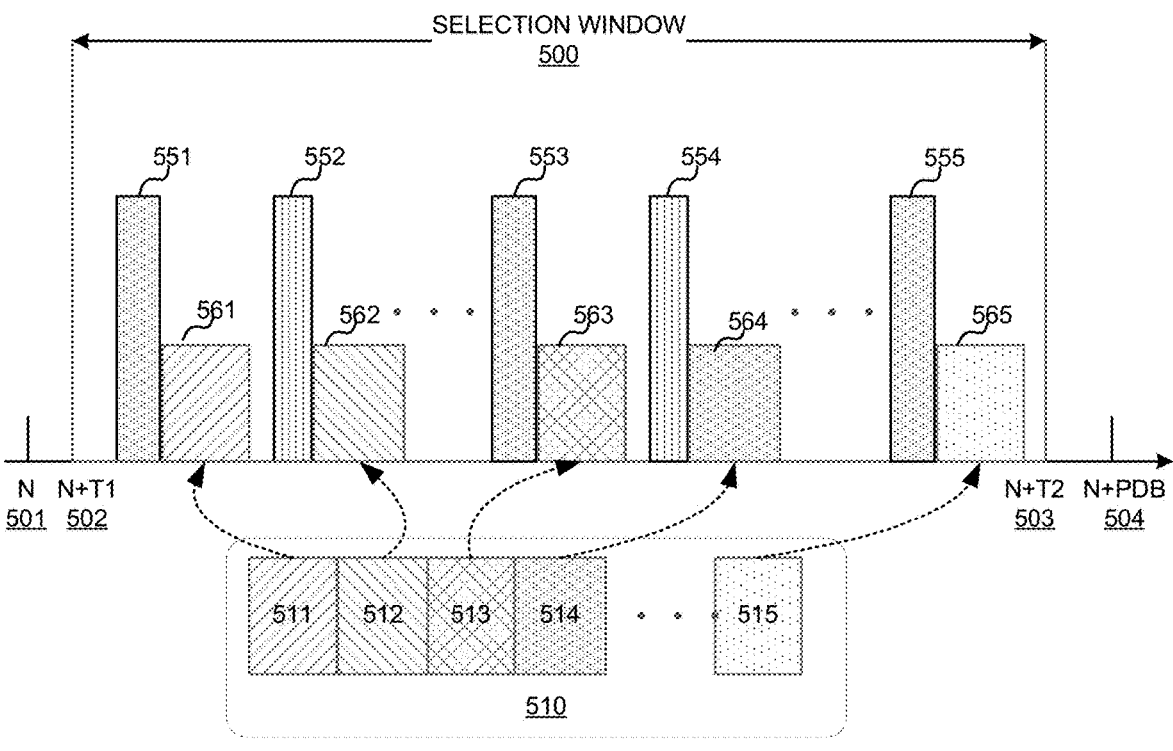
FIG. 5 illustrates exemplary diagrams of configurable number of selected candidate resources for sidelink transceiving in the unlicensed frequency bands in accordance with embodiments of the current invention.

FIG. 5 illustrates exemplary diagrams of configurable number of selected candidate resources for sidelink transceiving in the unlicensed frequency bands in accordance with embodiments of the current invention. In one novel aspect, candidate resources are selected with SL resource selection procedure. The LBT procedure is performed before the transmission using the selected candidate resources. When the LBT succeeds, the UE transmits the SL traffic with the selected SL resources in the unlicensed frequency bands. When the LBT fails, the sidelink cannot perform transmission on the selected candidate resources. In one embodiment, the UE waits for the next selected/reserved resource to perform the LBT procedure.

A data transmission is triggered at slot n 501. At slot n+T1 502, selection window 500 starts. Selection window 500 ends at slot n+T2 503, wherein time of the slot n+T2 503 is before time n+PDB 504. During the selection procedure, the sidelink UE selects N candidate resources 510 within the selection window for the initial transmission of the TB and the following N−1 blind or HARQ re-transmissions. The value of N can be preconfigured or dynamically updated. Selected resources 510 includes exemplary resources 511, 512, 513, 514, and 515. Within selection window 500, LBT 551 is performed successfully with resource 561. LBT 552 failed with resource 562. LBT 553 is performed after waiting for the next resource 563. LBT 554 succeeds with resource 564. LBT 555 failed with resource 565. In one embodiment, the next resource is selected when the LBT failed. In one example, resources 561, 562, 563, 564, and 565 correspond to resources 511, 512, 513, 514, and 515, respectively. In one embodiment, Selected resource 510 has an overbooking size larger than or equal to the resource size required for the SL data transceiving. In another embodiment, the candidate resources are multiple consecutive slots. In one embodiment, the procedure is iterated from the first selected/reserved resource to the last one.

Figure 6:
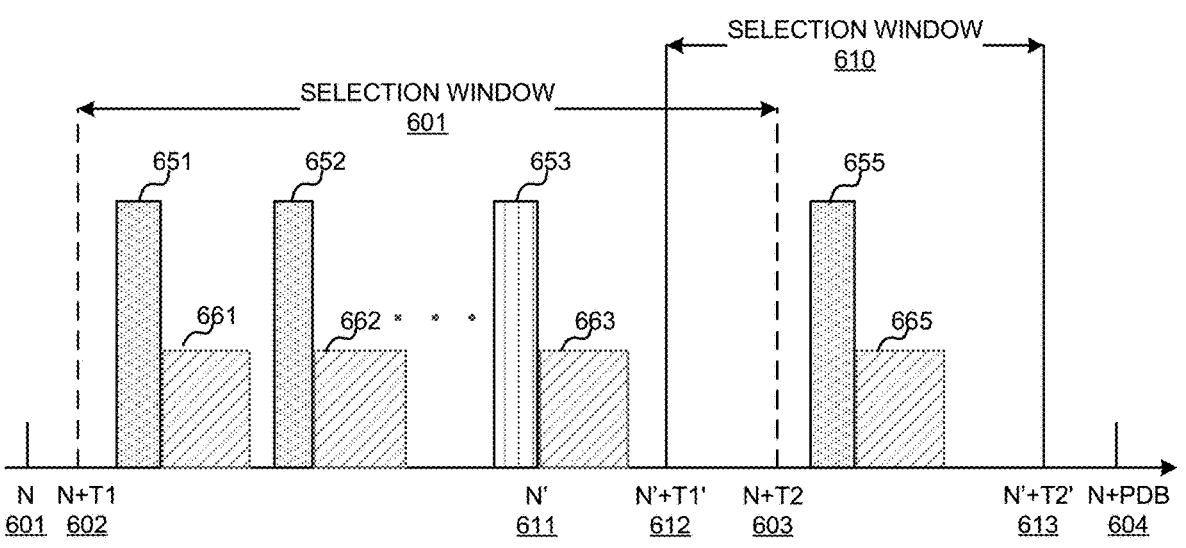
FIG. 6 illustrates exemplary diagrams of configurable location of new selection windows in accordance with embodiments of the current invention.

FIG. 6 illustrates exemplary diagrams of configurable location of new selection windows in accordance with embodiments of the current invention. In one embodiment, the initial selection window SW can be dynamically configured according to the LBT failure probability (e.g., derived/determined based on the ratio of the failure times over the total times for LBT sensing in the past X ms/slots, or the consecutive number of LBT failure times) and/or channel loading status information and/or channel congestion control information. If the LBT before one initially selected/reserved resource is failed, the sidelink UE defines a new selection window SW', and then the sidelink UE can select/reserve a new resource in the new selection window SW'. A data transmission is triggered at slot n 601. At slot n+T1 602, selection window 601 starts. Selection window 601 ends at slot n+T2 603, wherein time n+T2 603 is before time n+PDB 604. LBT 651 and 652 are performed for resources 661 and 662, respectively. LBT 651 and 652 both succeeded. LBT 653 failed. At slot n' 611, LBT 653 is failed. The new selection window SW' 610 starts at slot n'+T1' 612 and end at slot n'+T2' 613, where T1' is the processing time required by the sidelink UE to turn from LBT sensing to resource selection/reservation. T2' must be within the range T2'≤PDB−(n'−n), which guarantees the new resource selection/reservation in the new selection window can be terminated before the PDB requirement of the traffic. It should be noted that the sidelink UE could have initially selected/reserved N resources in the initial selection window SW. Therefore, the sidelink UE may detect that a subset of $N_{sub}$ ($0 \le N_{sub} \le N$) of the initially selected/reserved resources are not available anymore because of multiple LBT failures. In this case, the sidelink UE will select $N_{sub}$ new resources in the new selection window SW' with the limit of the PDB requirement.

In one novel aspect, configuration parameters/values for the SL resource selection are dynamically determined, including $N_{SCI}$, $N_{max}$ relating to the number of candidate resource selected, and $$N_{max}^*.$$

For the unlicensed spectrum with SL-U communication, there may be operations of the other wireless systems such as NR-U, Wi-Fi, etc. The LBT before the selected/reserved resource may fail, which means the corresponding transmission cannot be performed anymore. This case will affect the resource allocation scheme of SL-U. In addition, the failure of the LBT may also lead to the resources that can be actually used for sidelink TB (re-)transmission are smaller than the original selected/reserved resource number N. In this case, the sidelink TB (re-)transmission may also fail due to insufficient resources. During the resource (re-) selection/reservation procedure, the sidelink UE should also consider the size limitation of the $1^{st}$-stage SCI. Particularly, the $1^{st}$-stage SCI can only indicate the selected/reserved resources located within thirty-two slots, which constrains the maximum gap between two consecutive selected/reserved resources. Besides, the $1^{st}$-stage SCI can only indicate a maximum number of $N_{SCI}$ selected/reserved resources. The maximum number of $N_{SCI}$ is (pre-)configured per resource pool and can be equal to one of the numbers in a range from 2-20.

Figure 7:
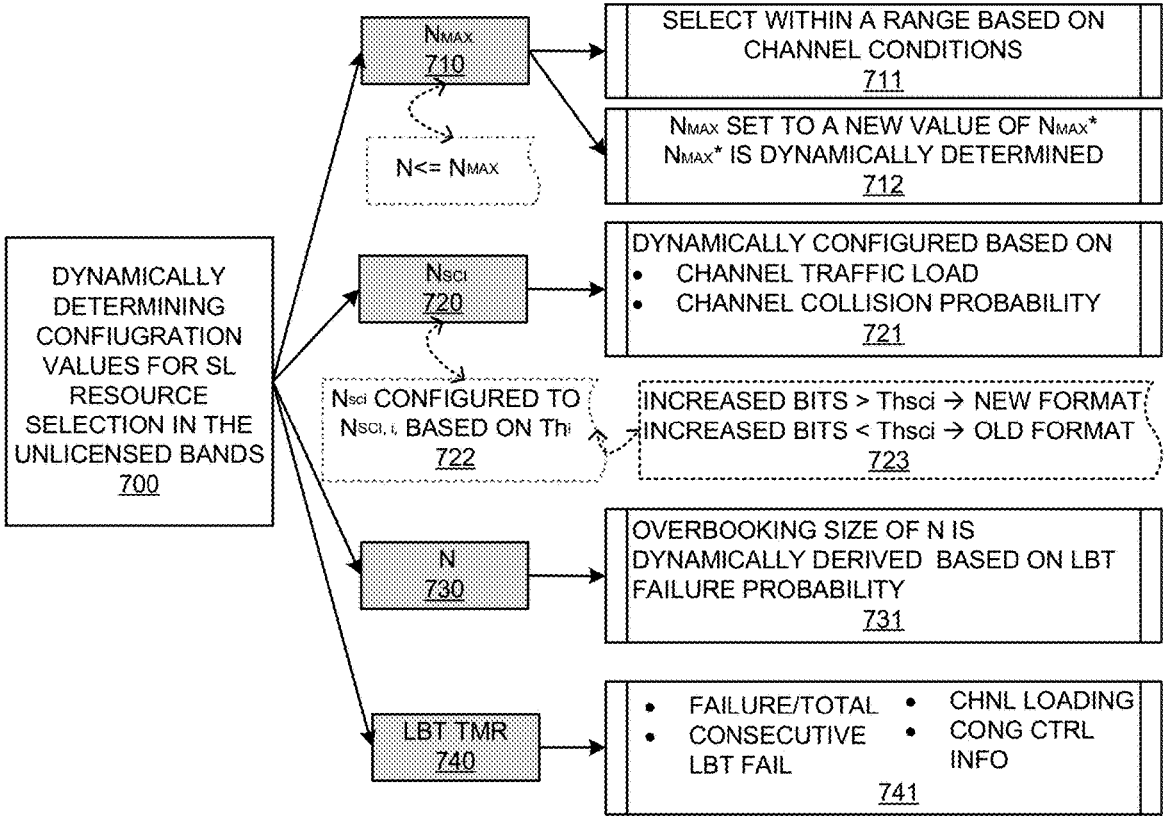
FIG. 7 illustrates exemplary diagrams for dynamic configuration of SL resource selection based on configuration or predefined conditions in accordance with embodiments of the current invention.

FIG. 7 illustrates exemplary diagrams for dynamic configuration of SL resource selection based on configuration or predefined conditions in accordance with embodiments of the current invention. In one novel aspect 700, the UE dynamically determines the configuration values for the SL resource selection in the unlicensed frequency bands. The exemplary configuration values include $N_{max}$ 710 relating to the number of candidate resource selected, $N_{SCI}$ 720, and N 730.

In one embodiment 710, $N_{max}$ is predefined or dynamically configured. During the selection procedure, the sidelink UE selects N candidate resources within the selection window for the initial transmission of the TB and the following N−1 blind or HARQ re-transmissions. The value of N is left to the UE implementation but should meet the range $N \leq N_{max}$. In one embodiment 711, $N_{max}$ is (pre-)configured within a range, such as $1 \leq N_{max} \leq 32$, and the value is selected based on one or more conditions, including the channel utilization or loading. In addition, the number of selected/reserved resource N should not be higher than the number of the available candidate resources.

In another embodiment 712, the $N_{max}$, is configured to a new range of $$N_{max}^*.$$

In addition, to avoid the number of the candidate selected/reserved resources can be used actually for TB (re-)transmission is insufficient due to the potential LBT failure, a method is, for example, the maximum number of the resources can be selected/reserved by the SL-U UE, i.e., $N_{max}$, can be configured within a new range $$1 \leq N_{max} \leq N_{max}^*,$$

where the value of $$N_{max}^*$$

can be configured larger than 32. In general, the value of $$N_{max}^*$$

can also be configured dynamically according to the LBT failure probability (e.g., derived/determined based on the ratio of the failure times over the total times for LBT sensing in the past X ms/slots, or the consecutive number of LBT failure times) and/or channel loading status information and/or channel congestion control information. For example, with the increase of the channel traffic load, and/or the channel collision probability, etc., $$N_{max}^*$$

can be configured with a larger number to combat the higher LBT failure probability. For example, if the channel traffic load, and/or the channel collision probability is higher than a threshold $$Th_i'',$$

the value of $$N_{max}^*$$

can be configured as the corresponding value $N_{max,i}$, where $$1 \leq i \leq I_{max}''$$

and $$I_{max}''$$

represents the size of the $$N_{max}^*$$

configuration set.

In embodiment 720, $N_{SCI}$ is determined dynamically. To combat the effect of the potential LBT failure, and guarantee the consecutive reservation information transmission, the maximum number of the selected/reserved resources indicated in the $1^{st}$-stage SCI (i.e., $N_{SCI}$), can be increased more than three or larger than the case without LBT operation. In one embodiment 721, $N_{SCI}$ is dynamically configured according to the channel traffic load, and/or the channel collision probability, etc. In particularly, with the increase of the channel traffic load, and/or the channel collision probability, etc., the value of $N_{SCI}$ can be adjusted larger to combat the higher LBT failure probability. For example in one embodiment 722, if the channel traffic load, and/or the channel collision probability is higher than a threshold $Th_i$, the value of $N_{SCI}$ can be configured as the corresponding value $N_{SCI,i}$, where $1 \leq i \leq l_{max}$ and $l_{max}$ represents the size of the $N_{SCI,i}$ configuration set or the total number of resources for a packet. For the case that more selected/reserved resources are indicated in $1^{st}$-stage SCI, the time resource assignment field in the $1^{st}$-stage SCI will be also increased. In embodiment 723, if the increased bits are larger than a threshold $Th_{sci}$, they can be carried on the $1^{st}$-stage SCI with a new format. If the increased bits are less than the threshold $Th_{sci}$, they can be carried on the $1^{st}$-stage SCI with original format. For example, if the maximum number of selected/reserved resources indicated in the $1^{st}$-stage SCI is configured larger than four, the $1^{st}$-stage SCI with a new format can be used. Otherwise, the $1^{st}$-stage SCI with original format can be used.

In one embodiment 730, the value of the selected/reserved resources N can be configured with an overbooking size larger than or equal to the original demand of the TB (re-)transmission, e.g., $N_{ori}$. Empowered by this principle, the SL-U UE can be configured to select/reserve more resources, which means the SL-U UE has more opportunities to execute LBT and (re-)transmit the TB. In one embodiment 731, the value of N can also be indicated/configured dynamically according to the LBT failure probability (e.g., derived/determined based on the ratio of the failure times over the total times for LBT sensing in the past X ms/slots, or the consecutive number of LBT failure times) and/or channel loading status information and/or channel congestion control information. For example, with the increase of the channel traffic load, and/or the channel collision probability, etc., N can be configured with a larger number to combat the higher LBT failure probability. If the channel traffic load, and/or the channel collision probability is higher than a threshold Th'$_i$, the value of N can be configured as the corresponding value N$_i$, where 1≤i≤I'$_{max}$ and I'$_{max}$ represents the size of the N$_i$ configuration set.

In embodiment 740, the LBT trigger time can be dynamically indicated/configured according to the actual resource overbooking number, and/or the LBT failure probability. In one embodiment 741, the LBT trigger time is derived/determined based on the ratio of the failure times over the total times for LBT sensing in the past X ms/slots, or the consecutive number of LBT failure times, and/or the channel loading status information and/or channel congestion control information. For example, the potential sensing slot (e.g., 9 μs) failure time can be assumed as n, which is related to the actual resource overbooking number, and/or the LBT failure probability, and/or the channel loading status information, etc. If the selected/reserved resource position is assumed as T, and the original LBT required time is assumed as $\Delta T_1$, then the original LBT trigger time is T−$\Delta T_1$. But with the proposed scheme, the actual LBT trigger time can be configured $\Delta T_2$ earlier than the original LBT trigger time, i.e., T−$\Delta T_1$−$\Delta T_2$, where $\Delta T_2$=n×T$_d$, and T$_d$ is the defer duration in the conventional LBT procedures. Next, when the LBT is successful, and if the gap between the LBT successful position and the selected/reserved resource position is larger than one symbol, the UE should conduct the LBT self-defer mechanism. Then immediately before the selected/reserved resource position, the UE can execute a relatively simpler LBT to access the corresponding resource. If the gap is no more than one symbol, the UE can utilize the CP extension to align the boundary between the of LBT successful position and the selected/reserved resource position. Empowered by this scheme, the sidelink UE can have more time and/or chances to try LBT, which further leads to an increased success probability of LBT.

FIG. 8 illustrates an exemplary flow chart for the resource selection for sidelink communication in unlicensed frequency bands in accordance with embodiments of the current invention. At step 801, the UE performs a sidelink (SL) resource selection procedure in a wireless network, wherein the SL resource selection procedure selects candidate resources in unlicensed frequency bands for an SL transceiving for the UE. At step 802, the UE performs a listen-before-talk (LBT) procedure before the SL transceiving, wherein the LBT procedure determines channel selection with other coexisting wireless system in the unlicensed frequency bands. At step 803, the UE transmits and/or receives SL packets on the selected candidate resources when both the SL resource selection procedure and the LBT procedure succeed.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   performing, by a user equipment (UE), a sidelink (SL) resource selection procedure in a wireless network, wherein the SL resource selection procedure selects candidate resources in unlicensed frequency bands for an SL transceiving for the UE based on one or more configuration parameters, and wherein the one or more configuration parameters are dynamically configured, and wherein the configuration parameters comprising a maximum number of resources to be configured, a maximum number of resources indicated in a 1$^{st}$-stage sidelink channel information (SCI);
   performing a listen-before-talk (LBT) procedure before the SL transceiving, wherein the LBT procedure determines channel selection with other coexisting wireless system in the unlicensed frequency bands; and
   transceiving SL packets on the selected candidate resources when both the SL resource selection procedure and the LBT procedure succeed.

2. The method of claim 1, wherein the LBT procedure is performed after the SL resource selection procedure.

3. The method of claim 1, wherein the candidate resource selected by the SL resource selection procedure has an overbooking resource size larger than or equal to a resource size required for the SL data transceiving.

4. The method of claim 3, wherein the overbooking resource size is dynamically determined based on one or more preconfigured conditions comprising an LBT failure probability, channel loading status information, and channel congestion control information.

5. The method of claim 3, wherein the overbooking resource size is preconfigured.

6. The method of claim 1, wherein the candidate resources are multi-consecutive-slot (MCSt) resources with configured multiple consecutive resource blocks.

7. The method of claim 1, wherein a Type-1 LBT is configured when the LBT procedure is performed outside a channel occupancy time (COT) or when the LBT procedure initiates a COT.

8. The method of claim 7, wherein a sensing period of the Type-1 LBT is determined by a channel access priority class (CAPC) of the SL transceiving.

9. The method of claim 7, wherein a duration of the COT is determined by a CAPC of the SL transceiving.

10. The method of claim 7, wherein a Type-2A, a Type-2B or a Type-2C LBT is configured when the LBT procedure is performed inside the COT.

11. The method of claim 1, wherein the configuration parameters further comprising a LBT trigger time.

12. The method of claim 1, further comprising: configuring a selection window, wherein the SL resource selection procedure is performed within the selection window, and the LBT procedure is performed before the selected candidate resource for the SL transceiving is triggered at a starting slot n, and wherein a starting slot for the selection window is slot n plus a processing time T1, and a sending slot for the selection window is before the slot n plus a packet delay budget (PDB).

13. The method of claim 12, wherein a new selection window is dynamically configured upon detecting a failure of the LBT procedure before an end of the selection window.

14. The method of claim 12, wherein the SL resource selection procedure excludes one or more candidate resources in the selection window based on predefined rules.

15. A user equipment (UE), comprising:
   a transceiver that transmits and receives radio frequency (RF) signal in a wireless network;
   a memory, and
   a processor coupled to the memory, the processor configured to
   perform sidelink (SL) resource selection procedure, wherein the SL resource selection procedure selects candidate resources in unlicensed frequency bands for an SL transceiving for the UE based on one or more configuration parameters, and wherein the one or more configuration parameters are dynamically configured, and wherein the configuration parameters comprising a maximum number of resources to be configured, a maximum number of resources indicated in a $1^{st}$-stage sidelink channel information (SCI);

perform a LBT procedure before the SL transceiving, wherein the LBT procedure determines channel selection with other coexisting wireless system in the unlicensed frequency bands; and transmit and receive SL packets on the selected candidate resources when both the SL resource selection procedure and the LBT procedure succeed.

16. The UE of claim 15, wherein the LBT procedure is performed after the SL resource selection procedure.

17. The UE of claim 15, wherein the candidate resource selected by the SL resource selection procedure has an overbooking resource size larger than or equal to a resource size required for the SL data transceiving.

18. The UE of claim 15, wherein the candidate resources are multi-consecutive-slot (MCSt) resources with configured multiple consecutive resource blocks.

19. The UE of claim 17, wherein a Type-1 LBT is configured when the LBT is performed outside a channel occupancy time (COT) or when the LBT initiates a COT, and a Type-2A, a Type-2B or a Type-2C LBT is configured when the LBT is performed inside the COT.

20. The UE of claim 15, wherein the configuration parameters further comprising a LBT trigger time.

* * * * *